United States Patent [19]
Yoshizawa et al.

[11] Patent Number: 5,749,089
[45] Date of Patent: May 5, 1998

[54] CACHE-MEMORY SYSTEM HAVING MULTIDIMENSIONAL SPREAD CACHE

[75] Inventors: Hideki Yoshizawa; Tatsushi Otsuka, both of Kawasaki, Japan

[73] Assignee: Fujitsu Limited, Kawasaki, Japan

[21] Appl. No.: 757,081

[22] Filed: Nov. 26, 1996

Related U.S. Application Data

[63] Continuation of Ser. No. 381,157, Jan. 31, 1995, abandoned.

[30] Foreign Application Priority Data

Jan. 31, 1994 [JP] Japan ...................... 6-009756

[51] Int. Cl.⁶ .................................................. G06F 12/06
[52] U.S. Cl. ...................... 711/127; 711/118; 711/3
[58] Field of Search .................................. 395/403, 405, 395/419, 445, 454, 455, 456, 465

[56] References Cited

U.S. PATENT DOCUMENTS

| | | | |
|---|---|---|---|
| 4,197,580 | 4/1980 | Chang et al. | 395/471 |
| 5,428,725 | 6/1995 | Sugai et al. | 395/136 |

FOREIGN PATENT DOCUMENTS

| | | |
|---|---|---|
| 2 238 490 | 9/1990 | Japan . |
| 2-238490 | 9/1990 | Japan . |
| 4-051373 | 2/1992 | Japan . |
| 4-102146 | 4/1992 | Japan . |
| 6-004396 | 1/1994 | Japan . |
| 2 180 128 | 3/1987 | United Kingdom . |

OTHER PUBLICATIONS

Article: "4–Megabit Block Random–Access Memory TMS92060 (5 V)" with translation*.
Article: "Block Random–Access Memory" with translation.
Hennessy et al, "Computer Architecture A Quantitative Approach", 1990, pp. 408–425.

*Primary Examiner*—Eddie P. Chan
*Assistant Examiner*—Kevin L. Ellis
*Attorney, Agent, or Firm*—Staas & Halsey

[57] ABSTRACT

Graphic data having a two-dimensional spread is divided into data blocks having a two-dimensional spread, for example, data blocks of 8×8 pixels, and with these data blocks as units, cache control is performed. A tag memory for making a decision as to the occurrence of a cache hit, stores therein a tag and a valid flag as well as a bank address in a cache memory at which the data block in question is stored. As a result, the relationship between each bank of the cache memory and the address in the tag memory is not fixed, which ensures efficient use of the cache memory even in situations where accesses concentrate in one particular memory area.

11 Claims, 17 Drawing Sheets

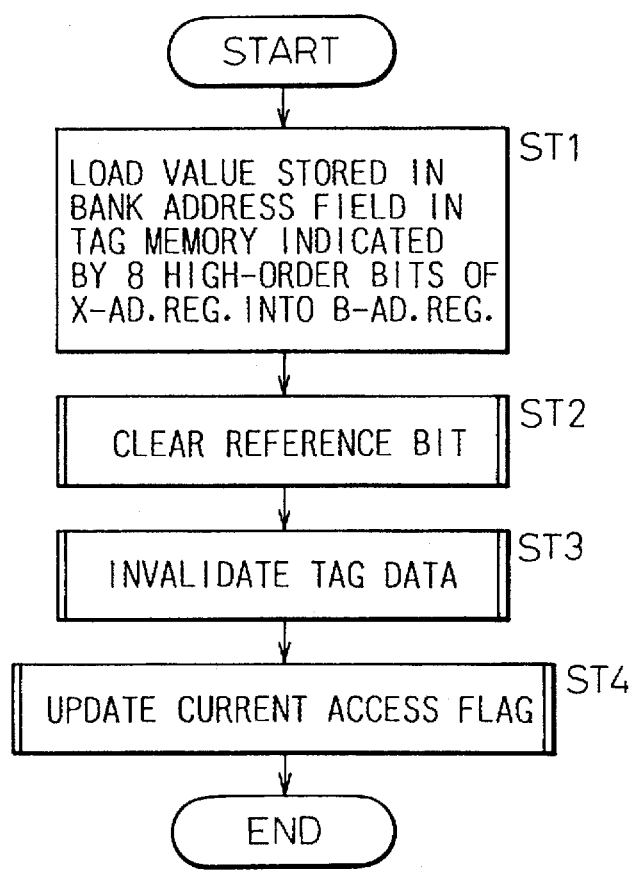

CACHE-MEMORY SYSTEM HAVING MULTIDIMENSIONAL SPREAD CACHE

This application is a continuation of application Ser. No. 08/381,157, filed Jan. 31, 1995, now abandoned.

BACKGROUND OF THE INVENTION

1. Field of the Invention

The present invention relates to a cache-memory system suitable for processing data arrayed in multidimensional space (each data item being addressable by a combination of a plurality of addresses), and more particularly to a cache-memory system that is suitable for high-speed processing of data arrayed in a two-dimensional plane (each data item being addressable by a combination of an X address and a Y address) such as the processing of 3-D graphic data.

2. Description of the Related Art

In an apparatus for processing data arrayed in multidimensional space such as 3-D graphic data, the graphic data are stored in a frame buffer memory such as a video RAM, and the processor performs read/write operations by directly accessing the graphic data stored in the frame buffer memory.

Since the amount of data arrayed in such multidimensional space is very large, a large-capacity semiconductor memory is used for the storage thereof. The access time of such a large-capacity semiconductor memory, however, is inherently long, and to achieve high-speed data processing, a cache-memory system is often used to reduce apparent access time.

On the other hand, the processing of data arranged in multidimensional space such as 3-D graphic data exhibits the characteristic that in the long term the processing tends to extend randomly over the entire space, while, in the short term, the processing tends to concentrate on data in a specific area which tends to have a certain spread either spatially or two-dimensionally. Accordingly, when employing a cache-memory system in an apparatus for processing data arrayed in multidimensional space, the cache-memory system must be designed by taking the above characteristic into consideration.

In Japanese Unexamined Patent Publication (Kokai) No. 4-102146 (a Japanese patent application claiming priority based on U.S. patent application Ser. No. 454,952), there is disclosed a cache-memory system that is used in conjunction with a frame buffer for display. However, as in cache systems widely used in general-purpose computer systems, each data block is identified by address bits, excluding, for example, three low-order bits, of the address in the main memory; each bank of the cache, therefore, stores a data block consisting, for example, of 8 words having contiguous addresses in the display frame buffer. That is, each data block only corresponds to a portion of one scanning line of an image to be displayed, but does not correspond to an area having a two-dimensional spread.

Furthermore, as in cache systems for general-purpose computer systems, direct mapping is employed which identifies each bank of the cache by using some address bits of the address for the display frame buffer; accordingly, which of the data stored in the frame buffer is stored in which bank is predetermined uniquely. As a result, because of the graphic data processing characteristic that the processing extends over the entire screen in the long term while, in the short term, the processing concentrates on a specific area, there occurs the problem that most of the cache banks are not used efficiently.

SUMMARY OF THE INVENTION

It is an object of the present invention to provide a cache-memory system that appropriately addresses the above-described characteristic in the processing of data arrayed in multidimensional space.

According to the present invention, there is provided a cache-memory system suitable for the processing of data stored in a main memory and whose location is specified by a combination of a plurality of data addresses, comprising: a cache memory having a plurality of memory areas for storing copies of data blocks, each data block being specified by a block address made up of a combination of respective high-order bits of the plurality of data addresses, data in each data block being specified by an intra-block address made up of a combination of the remaining low-order bits of the plurality of data addresses; a cache comparator for judging whether a copy of the data specified by a combination of a plurality of specific data addresses is stored in the cache memory, that is, whether a cache hit or a cache miss has occurred; and a control block for controlling the main memory and the cache memory in accordance with the result of the judgement made by the cache comparator.

According to the present invention, there is also provided a cache-memory system suitable for the processing of data stored in a main memory and whose location is specified by a combination of a plurality of data addresses, comprising: a cache memory having a plurality of memory areas for storing copies of data blocks, each data block being specified by a block address made up of a first part of a combination of the plurality of data addresses, data in each data block being specified by an intra-block address made up of the remaining second part of the combination of the plurality of data addresses; a cache comparator for judging whether a copy of the data specified by a combination of a plurality of specific data addresses is stored in the cache memory, that is, whether a cache hit or a cache miss has occurred; and a control block for controlling the main memory and the cache memory in accordance with the result of the judgement made by the cache comparator, wherein the cache comparator includes:

a tag memory for storing, in a memory location specified by a tag address made up of a first part of bits constituting the block address, a tag made up of the remaining second part of the bits constituting the block address, and for storing in the memory location a valid flag indicating whether a copy of the data block specified by the block address determined by the tag and the tag address thereof is validly stored in any of the memory areas in the cache memory, and storing a bank address that specifies the memory area holding the copy if it is validly held; and a match detection circuit for judging that a cache hit has occurred, if the tag stored in the memory location in the tag memory specified by the tag address derived from the block address derived from the combination of the specific data addresses matches the tag derived from the block address, and if the valid flag stored in the memory location is true, and the control block includes means for reading out a bank address stored in the memory location in the tag memory specified by the tag address derived from the combination of the specific data addresses, when an instruction is given to access via the cache memory the memory location specified by the combination of the specific data addresses, and when the match detection circuit judges that a cache hit has occurred, and for accessing the memory location specified by the intra-block address derived from the combination of the specific data addresses, in the copy of the data block stored in the memory area in the cache memory specified by the bank address.

BRIEF DESCRIPTION OF THE DRAWINGS

FIG. 10 is a diagram showing a process flow for a cache invalidation operation;

DESCRIPTION OF THE PREFERRED EMBODIMENTS

The present invention will now be described in detail below in accordance with the preferred embodiments in which the invention is embodied in an image processing apparatus that handles two-dimensional image data.

Figure 1:
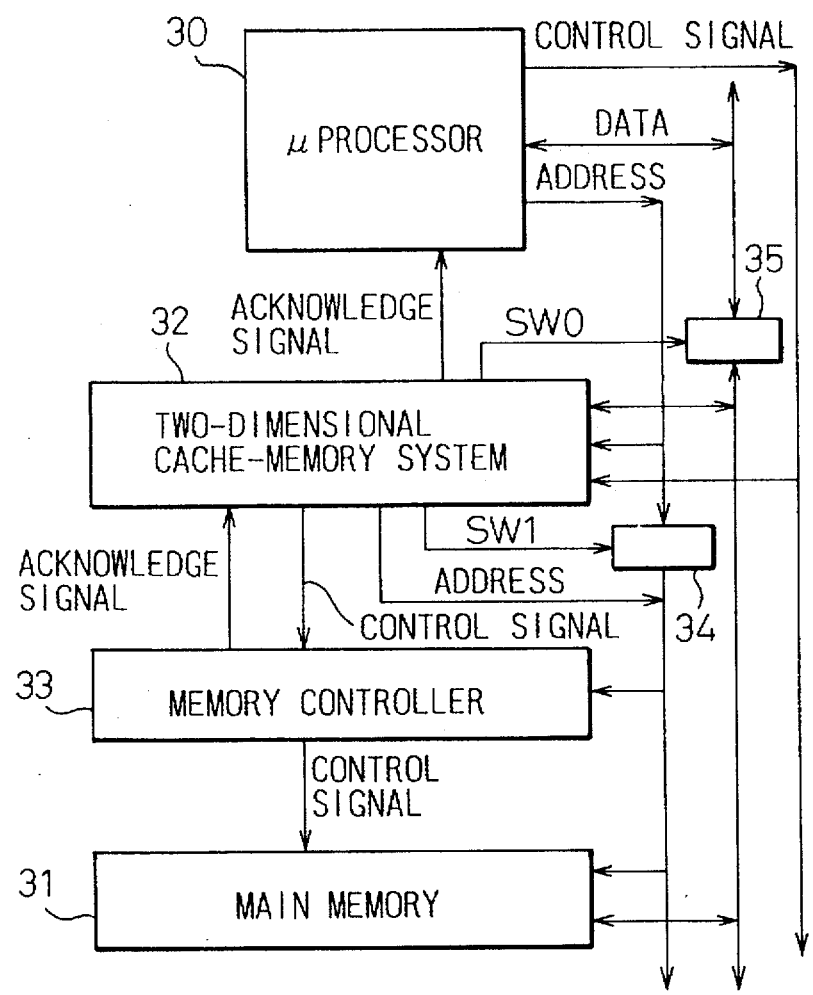
FIG. 1 is a block diagram showing the configuration of an image processing apparatus employing a two-dimensional cache-memory system according to one embodiment of the present invention.

FIG. 1 illustrates one embodiment of an image processing apparatus according to the present invention. In the figure, numeral 30 is a processor; 31 is a main memory; 32 is a two-dimensional cache-memory system for caching data blocks cut out from image data and having a two-dimensional spread; 33 is a memory controller for controlling the transfer of data blocks from the main memory 31; 34 is a buffer for switching between addresses (one from the processor 30 and the other from the two-dimensional cache-memory system 32) for supply to the main memory 31 in response to a control signal (SW1) from the two-dimensional cache-memory system 32; and 35 is a buffer for switching data (one from the main memory 31 and the other from the two-dimensional cache-memory system 32) for supply to the processor 30 in response to a control signal (SW0) from the two-dimensional cache-memory system 32.

As shown in the figure, a first feature of the image processing apparatus according to the invention is that the two-dimensional cache-memory system 32 for caching data blocks cut out from image data and having a two-dimensional spread is interposed between the processor 30 and the main memory 31.

Figure 2:
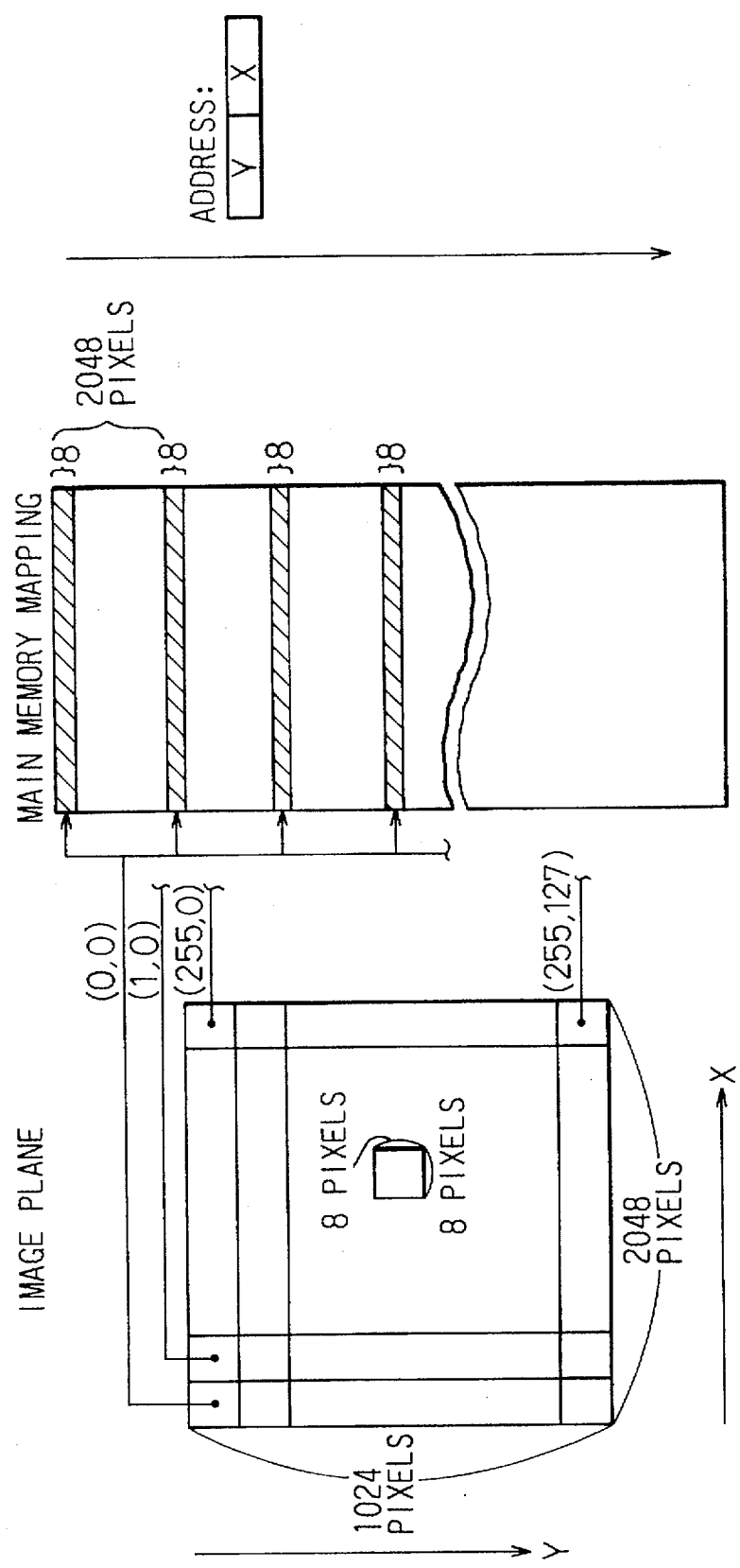
FIG. 2 is a diagram for explaining how image data is stored.
Figure 3:
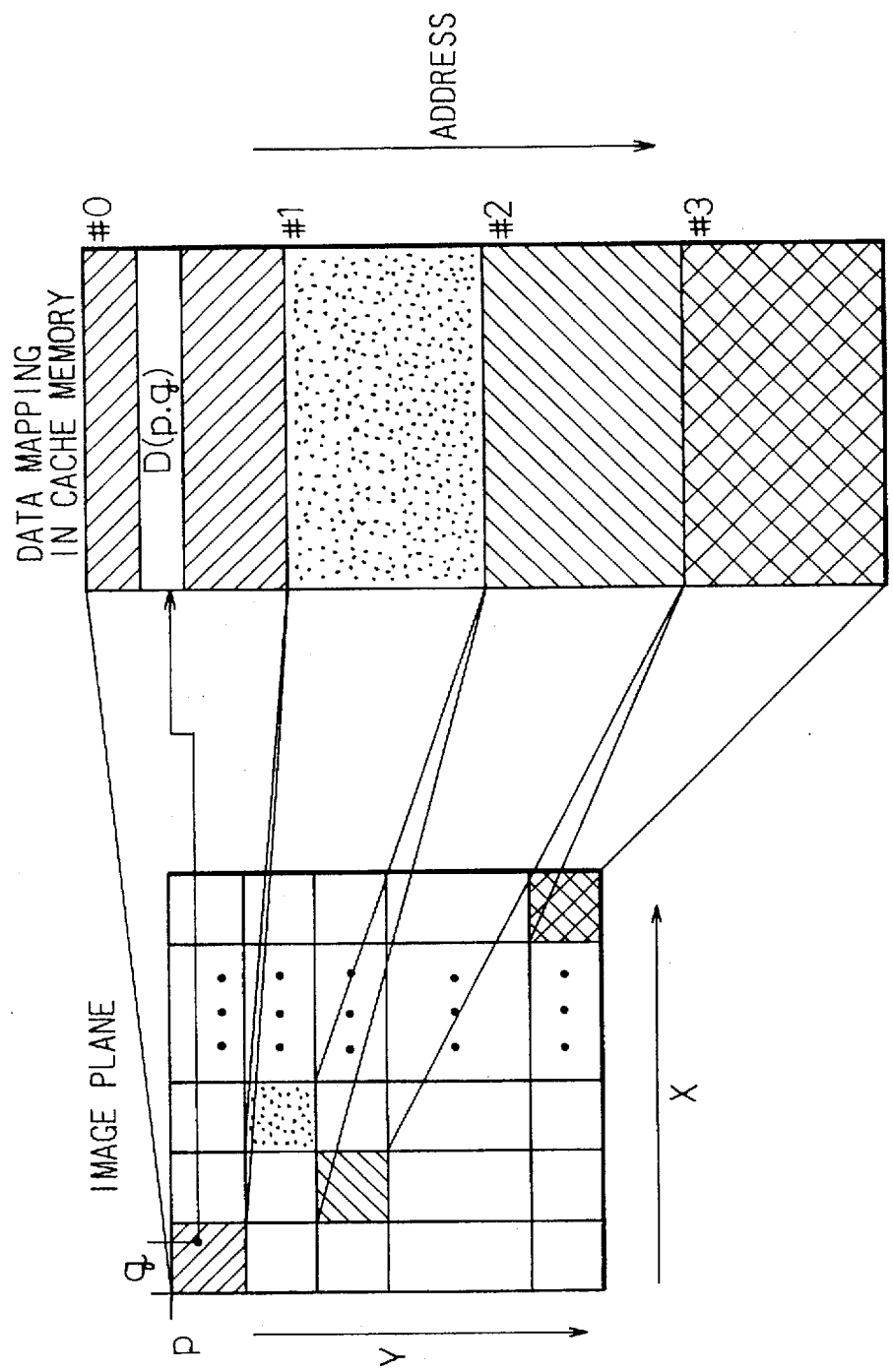
FIG. 3 is a diagram for explaining cache memory mapping.

For image data consisting of 2048×1024 pixels, for example, if each data block is to be made up of 8×8 pixels, the image data stored in the main memory 31 is divided into 255×128 data blocks starting at block address (0, 0) and ending at (255, 127), as shown in FIG. 2. Since the main memory 31 is addressed with X address as the low-order address and Y address as the high-order address, such as shown in FIG. 2, each data block, for example, the data block (0, 0), is mapped to the location shown by hatching in FIG. 2. The two-dimensional cache-memory system 32 has four memory areas (#0–#3), for example, as shown in FIG. 3, and caches one data block into each of these memory areas (banks).

For convenience of explanation, the following description assumes that image data has a size of 2048×1024 pixels and each data block consists of 8×8 pixels. Accordingly, the X address of the image data is 11 bits long and the Y address is 10 bits long, and each data block is identified by a block address (X', Y'), i.e., the combination of an 8-bit X' and a 7-bit Y'.

Figure 4:
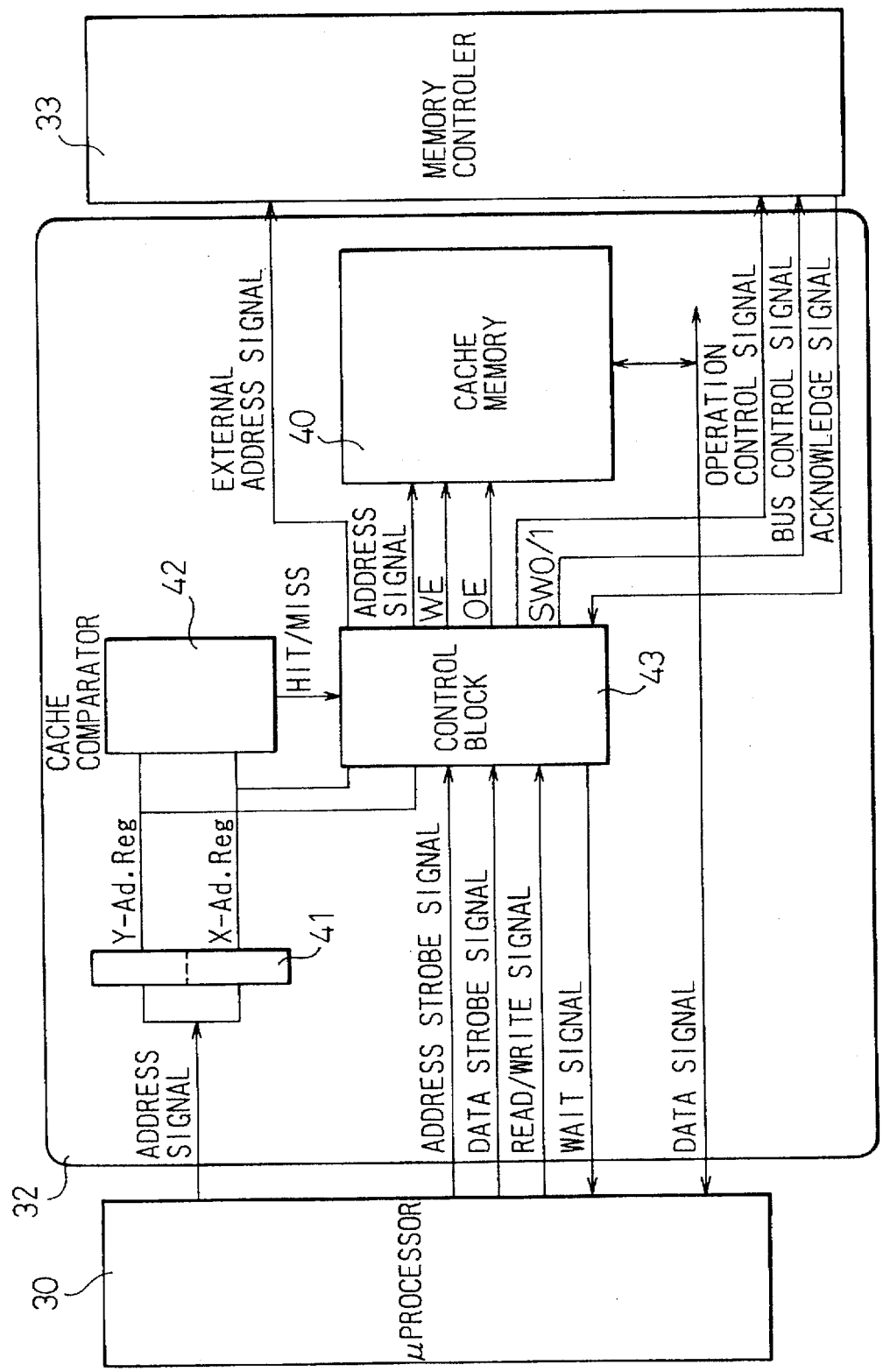
FIG. 4 is a diagram showing the configuration of the two-dimensional cache-memory system.

FIG. 4 shows a detailed configuration of the two-dimensional cache-memory system 32. In the figure, numeral 40 indicates a cache memory, having, for example, four memory areas (banks), for temporarily storing copies of image data blocks; 41 denotes an X/Y address register for latching the X and Y addresses of image data issued from the processor 30; 42 designates a cache comparator for detecting whether or not a copy of the data block containing the image data requested by the processor 30 is validly stored in the cache memory 40; and 43 represents a control block for performing caching control operations. An 11-bit X address register constituting the X/Y address registers 41 may sometimes be designated by reference sign 41a and a 10-bit Y address register constituting the X/Y address registers 41 by reference sign 41b in the description given hereinafter.

Figure 5:
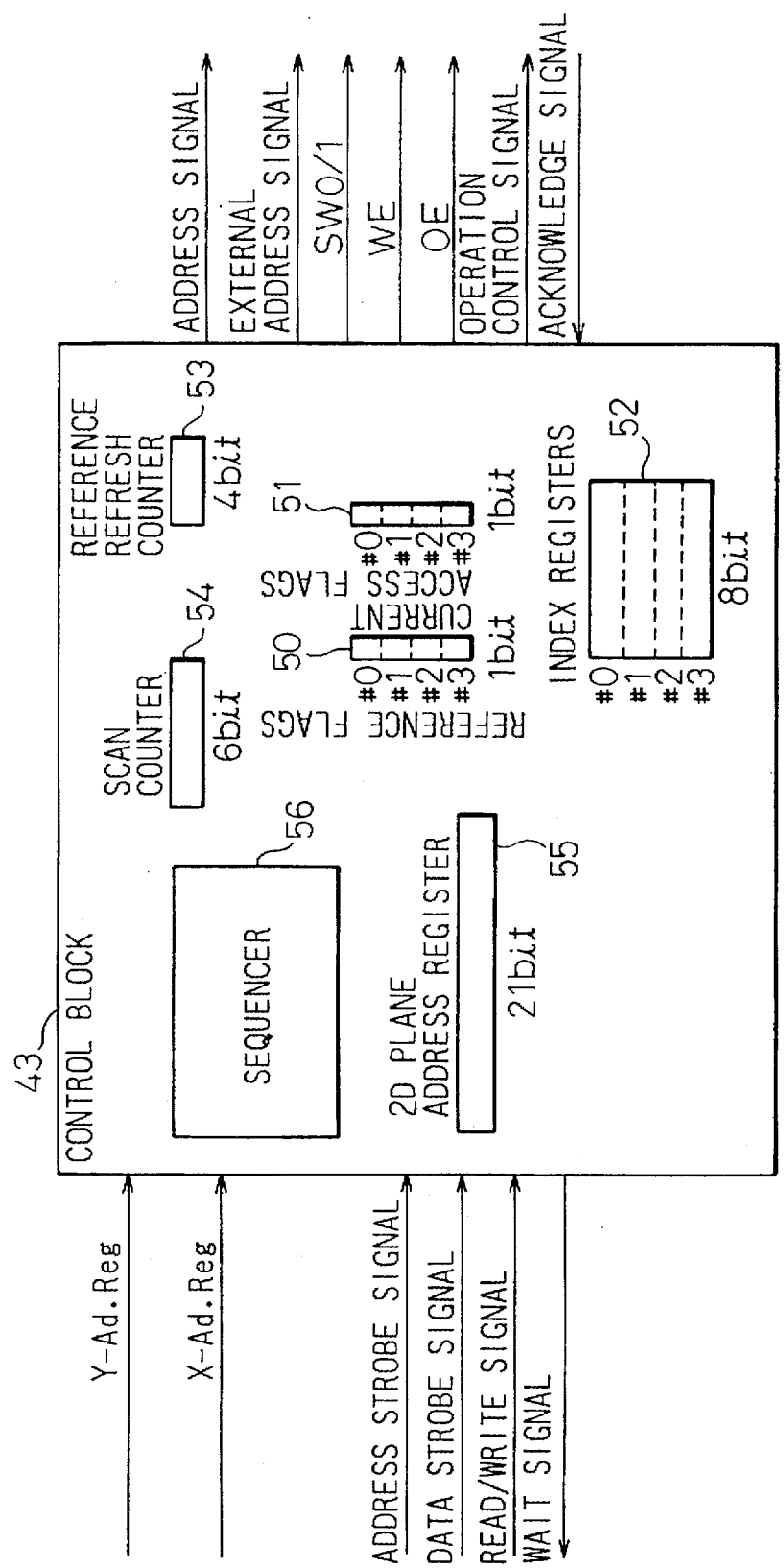
FIG. 5 is a diagram showing the configuration of a control block.
Figure 6:
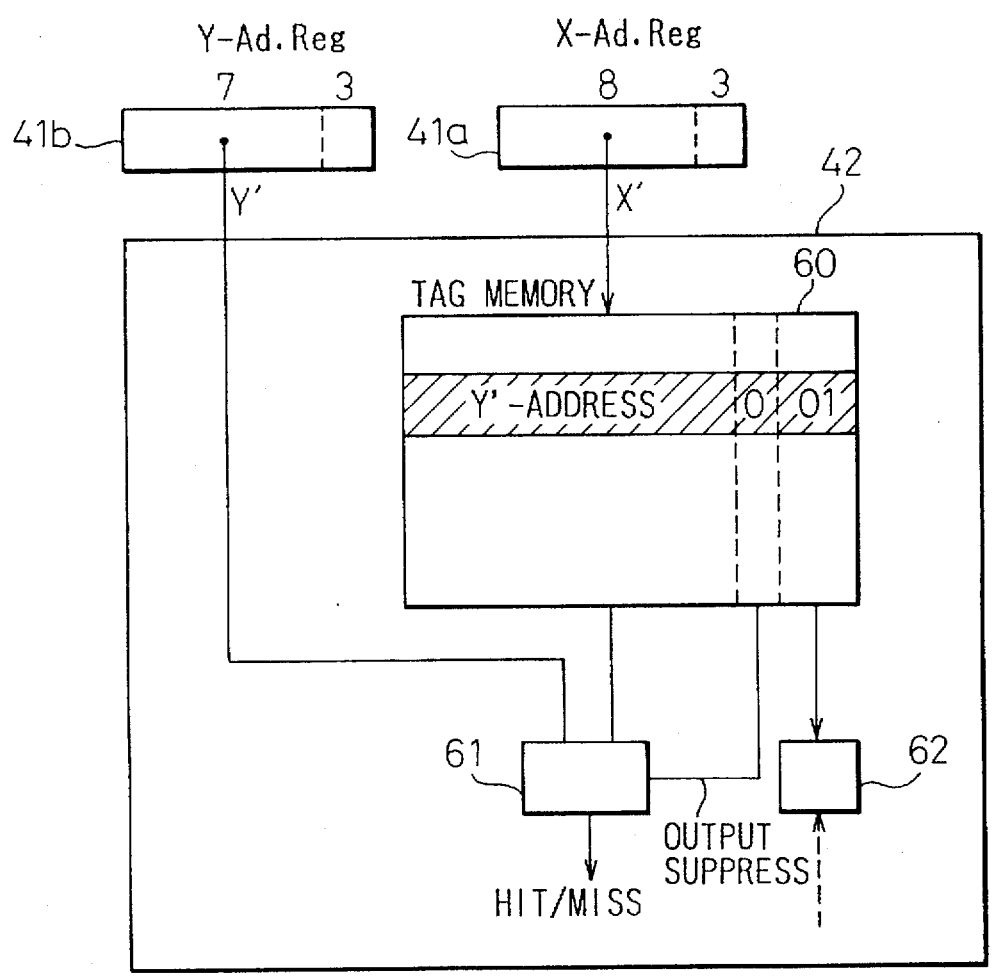
FIG. 6 is a diagram showing the configuration of a cache comparator.

FIG. 5 shows a detailed configuration of the control block 43, and FIG. 6 displays a detailed configuration of the cache comparator 42.

As shown in FIG. 5, the control block 43 comprises: reference flags 50, one provided for each of the four memory areas (banks) of the cache memory 40, for managing the history of the occurrence or non-occurrence of an access to the data blocks stored in the respective memory areas; current access flags 51, one provided for each of the four memory areas of the cache memory 40, for managing whether or not the data block stored in the corresponding memory area is the most recently accessed data; index registers 52, provided one for each of the four memory areas of the cache memory 40, for managing the indexes X' (serving as the tag address for addressing a TAG memory 60 hereinafter described) of the data blocks stored in the respective memory areas; a 4-bit reference refresh counter 53; a 6-bit scan counter 54; a 21-bit 2-D plane address register 55 for latching an address used to access the main memory 31; and a sequencer 56 for controlling the entire operation.

On the other hand, as shown in FIG. 6, the cache comparator 42 comprises the TAG memory 60 which is addressed by a tag address X' made up of the 8 high-order bits of the X address stored in the X address register 41a, which stores the tag Y' of a cached data block and which also stores a valid bit for indicating whether the cached data block is valid or not, and the bank address of the memory area where the cached data block is stored. The cache comparator 42 further comprises: a match detection circuit 61 which determines whether the tag Y' read out of the TAG memory 60 by being addressed by an X' value matches the Y' value stored in the Y address register 41b, and which outputs a hit signal when they match and the valid bit indicates the validity of the data in cache, and otherwise outputs a miss hit signal; and a bank address register 62 for latching the bank address of the destination memory area read out of the TAG memory 60 (in some cases, the bank address may be set externally).

In a specific example, when a valid data block having a block address (X', Y')=(102, 38) is stored in the memory area of bank address "#3" in the cache memory 40, the TAG memory 60 stores a tag "Y'=38" in the TAG field addressed by a tag address "X'=102", a value "valid bit=0" in the valid bit field, and a value "bank address=3", in the bank address field. Each access position within data block stored in the cache memory 40 is designated by an intra-block address made up of the 3 low-order bits of the X address and the 3 low-order bits of the Y address.

While the cache system of the present invention includes a tag memory having a configuration similar to the conventional congruent type, the tag memory according to the invention has a bank address field for indirectly specifying each bank of the cache; hence a second feature is that the relationship between the stored tag and the bank is determined dynamically.

Since the image data is two-dimensional data, there exist data blocks that are identical in tag address X' but different in tag Y'. In the present embodiment, however, simultaneous caching of such data blocks is not allowed. By employing a multi-way configuration, as in set associative organizations used in general-purpose computers, such caching may be allowed.

Next, the processing operations performed by the two-dimensional cache-memory system 32 will be described with reference to the flowcharts shown in FIGS. 7 to 16. For those skilled in the art, it will be possible to describe the behavior in a hardware description language (HDL) such as a Verilog-HDL at a register transfer level (RTL) in accordance with the flowcharts and to automatically obtain design data of a gate level circuit by inputting the description written in RTL to a logic synthesis tool. Therefore, the operational description given hereinafter with reference to the flowcharts will be substituted for a detailed description of the circuit configuration.

Figure 7:
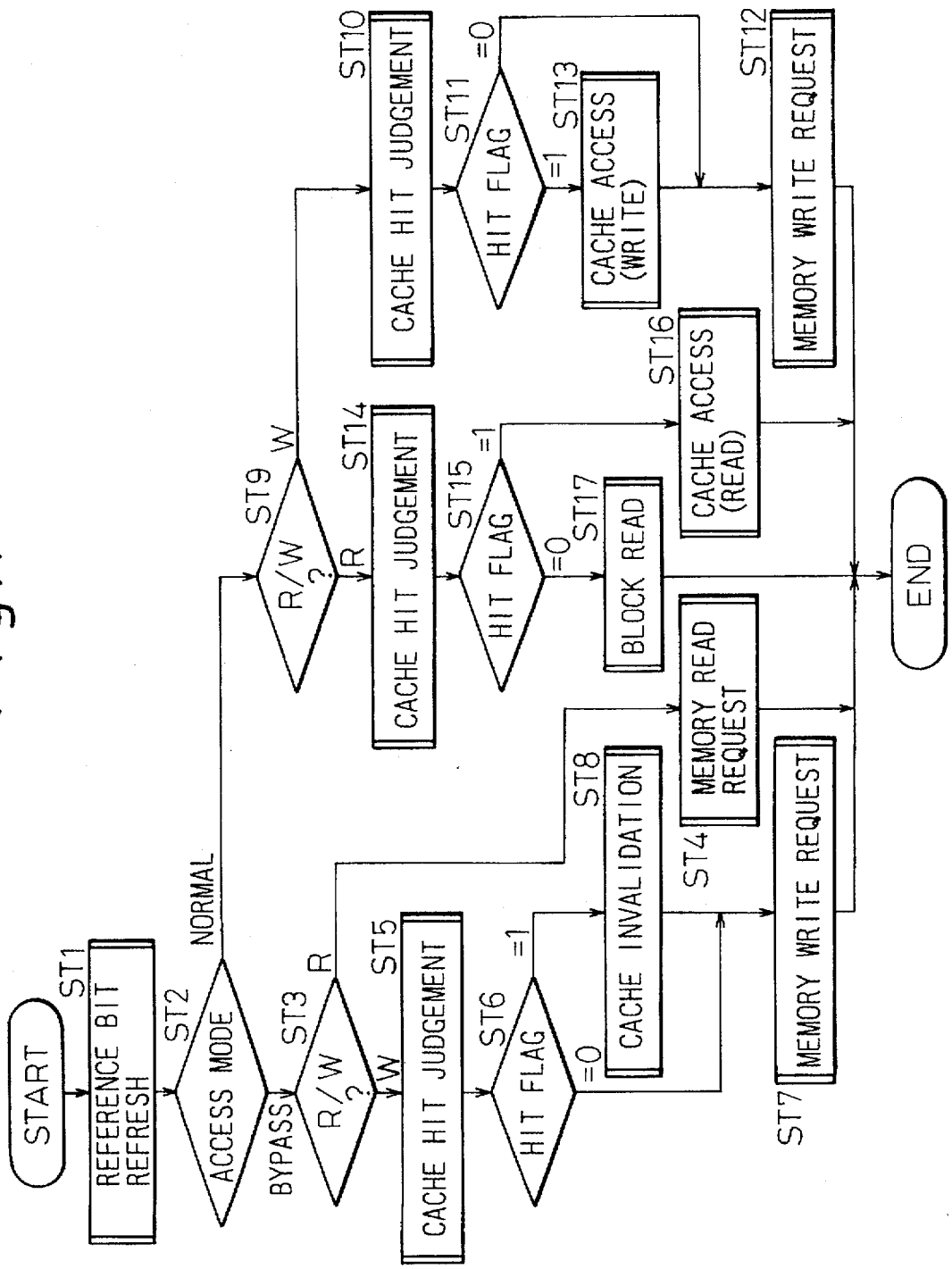
FIG. 7 is a diagram showing a main process flow.

When the processor 30 makes an access request, the two-dimensional cache-memory system 32 first performs a reference bit refresh operation as shown in step ST1 in the main process flow of FIG. 7.

Figure 8:
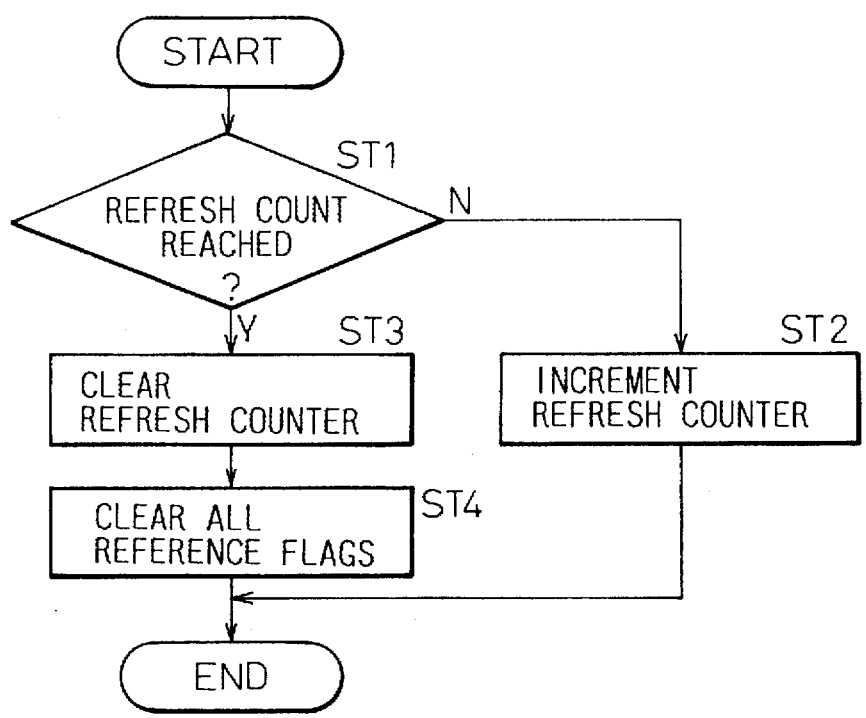
FIG. 8 is a diagram showing a process flow for a reference bit refresh operation.

In the reference bit refresh operation, as shown in detail in the process flow of FIG. 8, first a decision is made as to whether the count value of the 4-bit refresh counter 53 has reached the maximum value. If it is decided that the count value has not reached the maximum value, the count value of the reference refresh counter 53 is incremented by 1, to terminate the refresh operation. On the other hand, if it is decided that the count value has reached the maximum value, then the count value of the reference refresh counter 53 is cleared, and also, the flag values of all the reference flags 50 are cleared, after which the refresh operation is terminated.

That is, in the above reference bit operation, the flag values of the reference flags 50 are reset each time when a predetermined number of access requests have been issued.

Next, as shown in step ST2 in the main process flow of FIG. 7, the access mode of the access request issued by the processor 30 is judged. There are two access modes in which the processor 30 issues an access request: a bypass mode in which the cache memory 40 is bypassed and an access is made directly to the main memory 31, and a normal mode in which an access is made to the cache memory 40. In step ST2, therefore, it is judged whether the access mode of the access request issued by the processor 30 is the bypass mode or the normal mode.

If it is judged as being the bypass mode, then as shown in step ST3 in the main process flow of FIG. 7, it is judged whether the access request issued by the processor 30 is a read request or a write request.

If it is judged as being a read request, then as shown in step ST4 in the main process flow of FIG. 7, a memory read request is issued to the main memory 31, since data matching between main memory and cache memory can be maintained if data is read from the main memory 31 in accordance with the bypass mode. After that, the process is terminated.

On the other hand, when the access request is judged as being a write request, data matching will not be maintained if data is written to the main memory 31 in accordance with the bypass mode; therefore, as shown in step ST5 in the main process flow of FIG. 7, a cache-hit judgement operation is performed to determine whether or not a copy of the data block containing the requested data is stored in the cache memory 40.

Figure 9:
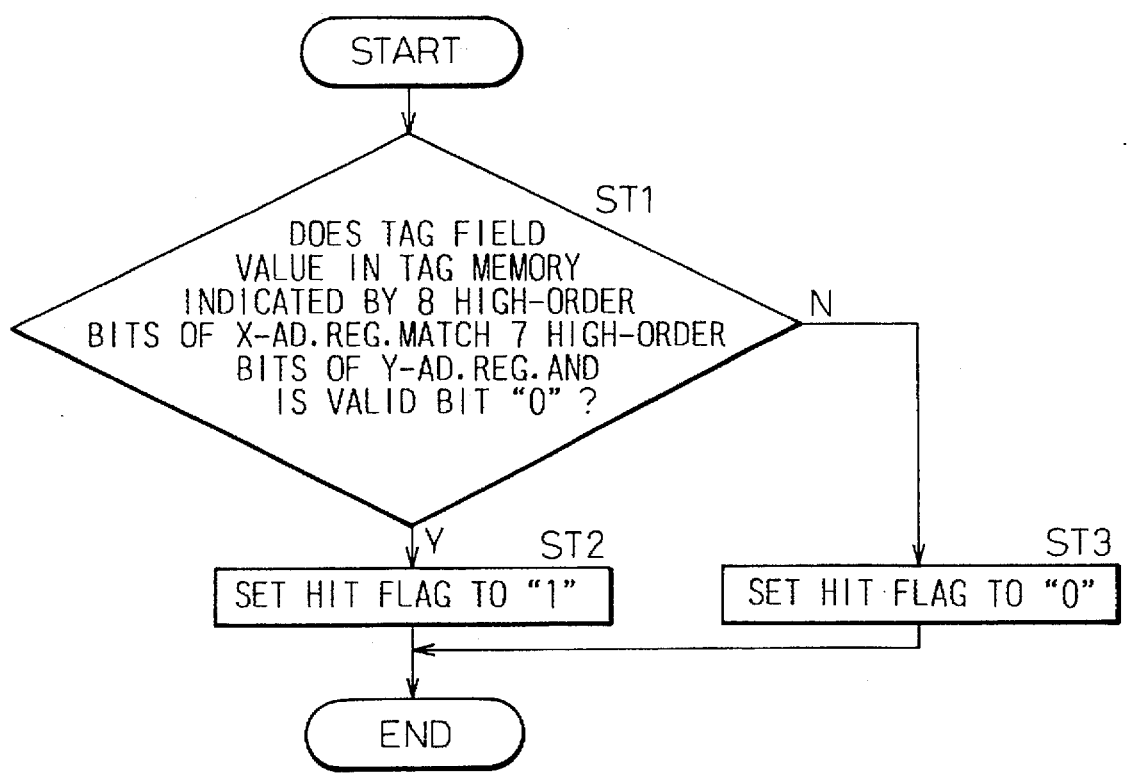
FIG. 9 is a diagram showing a process flow for a cache hit judgement operation.

As shown in detail in the process flow of FIG. 9, the cache-hit judgement operation is initiated by activating the cache comparator 42. More specifically, by addressing the TAG memory 60 using the 8 high-order bits X' of the X address stored in the X address register 41a, the 7 high-order bits Y' of the Y address and the valid bit are read out of the TAG memory 60, and detection is made to determine whether the readout Y' value matches the value Y' of the 7 high-order bits of the Y address stored in the Y address register 41b and also whether the valid bit is "0" indicating that the data is valid. As a result of the detection, if it is judged that a hit occurs to the cache memory 40, a hit flag not shown is set to "1", and the process is terminated; if it is judged that a cache miss occurs, the hit flag is set to "0", and the process is terminated.

That is, in the cache hit judgement process, the cache comparator 42 is activated which then checks whether a copy of the data block indicated by the write request address issued by the processor 30 is stored as valid data in the cache memory 40; if it is stored as valid data, the hit flag is set to "1", and otherwise, the hit flag is set to "0".

Next, as shown in step ST6 in the main process flow of FIG. 7, the hit flag is tested to determine whether the flag value is "1" or "0".

If it is determined in this step that the hit flag value is "0", the data to be written is not present in the cache memory 40, and no effect will be caused if the data is written from the main memory 31 in accordance with the bypass mode. Therefore, as shown in step ST7 in the main process flow of FIG. 7, a memory write request is immediately issued to the main memory 31, after which the process is terminated.

On the other hand, if it is determined that the hit flag value is "1", then as shown in step ST8 in the main process flow of FIG. 7, a cache invalidation operation is performed to maintain data matching, and then, a memory write request is issued to the main memory 31, after which the process is terminated.

In the cache invalidation process, as shown in detail in the process flow of FIG. 10, first an access is made to the bank address field in the TAG memory 60 indicated by the X' stored in the X address register 41a, and the bank address stored in that field is read out and loaded into the bank address register 62. Next, as shown in the process flow of FIG. 15A, the flag bit of the reference flag 50 corresponding to the bank address held in the bank address register 62 is set to "0" indicating no access occurrence. Then, as shown in the process flow of FIG. 16A, the valid bit for the entry in the TAG memory 60 indicated by the X' value of the index register 52 corresponding to the bank address held in the bank address register 62 is set to "1" indicating that the data is invalid. Next, as shown in the process flow of FIG. 15C, the flag values of all the current access flags 51 are set to "0" first, and then, the flag value of the current access flag 51 corresponding to the bank address held in the bank address register 62 is set to "1" indicating the existence of the most recently accessed data, after which the process is terminated.

That is, in the cache invalidation process, registration information is invalidated for the data block containing the data to be written to the main memory 31 in accordance with the bypass mode, and the flag value of the current access flag 51 is updated.

On the other hand, in step ST2 in the main process flow of FIG. 7, if the access request issued by the processor 30 is judged as being the normal mode, then as shown in step ST9 in the main process flow of FIG. 7, it is judged whether the access request issued by the processor 30 is a read request or a write request.

If the access request is judged as being a write request, then as shown in step ST10 in the main process flow of FIG. 7, a cache-hit judgement operation is performed to determine whether or not a copy of the data block containing the data requested to write is present in the cache memory 40.

The cache-hit judgement process performed in this step is the same as that performed in step ST5 in the main process flow of FIG. 7. That is, the cache comparator 42 is activated which then checks whether a copy of the data block indicated by the write request address issued by the processor 30 is stored as valid data in the cache memory 40; if it is stored as valid data, the hit flag is set to "1", and otherwise, the hit flag is set to "0".

Next, as shown in step ST11 in the main process flow of FIG. 7, the hit flag is tested to determine whether the flag value is "1" or "0".

If it is determined in this step that the hit flag value is "0", the data to be written is not present in the cache memory 40. Therefore, as shown in step ST12 in the main process flow of FIG. 7, a memory write request is immediately issued to the main memory 31, after which the process is terminated.

On the other hand, if it is determined that the hit flag value is "1", the data to be written is present in the cache memory 40; therefore, as shown in step ST13 in the main process flow of FIG. 7, a cache access operation for data write is performed to rewrite the write data stored in the cache memory 40, and after that, to maintain data matching, a memory write request is issued to the main memory 31 before terminating the process.

Figure 11B:
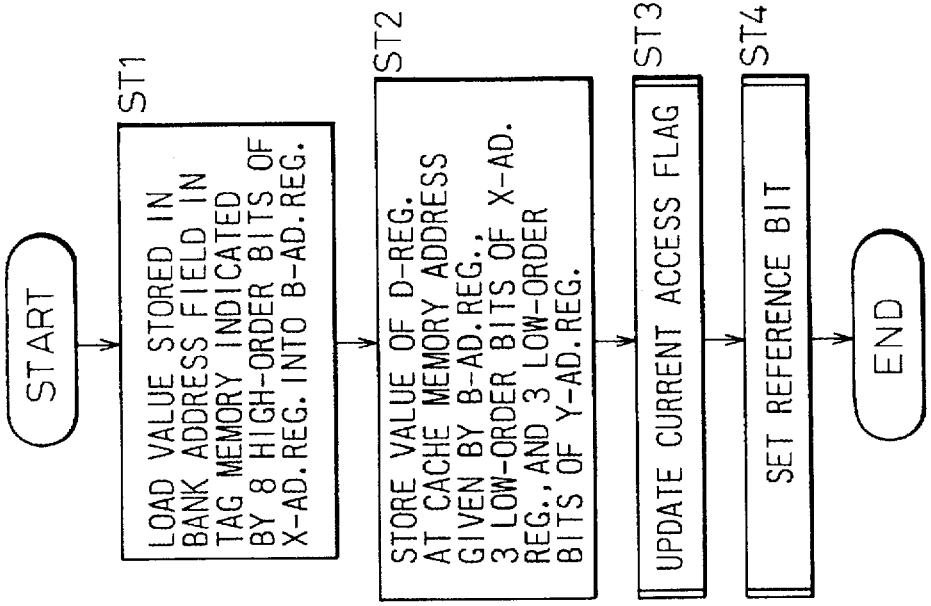
FIGS. 11A and 11B are diagrams each showing a process flow for a cache access operation.

In the cache access operation for data write, as shown in detail in the process flow of FIG. 11B, first an access is made to the bank address field in the TAG memory 60 indicated by the X' stored in the X address register 41a, and the bank address stored in that field is read out and loaded into the bank address register 62. Next, the intra-block address, specified by the 3 low-order bits of the X address stored in the X address register 41a and the 3 low-order bits of the Y address stored in the Y address register 41b, is identified, and in accordance with the intra-block address, the write position is designated in the data block stored in the memory area indicated by the value stored in the bank address register 62, so that the write data transferred from the processor 30 and held in a read register not shown (D register) is stored into the designated position. Next, as shown in the process flow of FIG. 15C, the flag values of all the current access flags 51 are set to "0" first, and then, the flag value of the current access flag 51 corresponding to the bank address held in the bank address register 62 is set to "1" indicating the existence of the most recently accessed data. Then, as shown in the process flow of FIG. 15B, the flag value of the reference flag 50 corresponding to the bank address held in the bank address register 62 is set to "1" (if it is already set, the value is left as is), after which the process is terminated.

That is, in the cache access operation for data write, the data stored in the cache memory 40 is replaced by the data requested by the processor 30, while the flag values of the current access flags 51 and reference flags 50 are updated.

On the other hand, if it is determined in step ST9 in the main process flow of FIG. 7 that the access request issued by the processor 30 is a read request, then as shown in step ST14 in the main process flow of FIG. 7, a cache-hit judgement operation is performed to determine whether a copy of the data block containing the read request data is stored in the cache memory 40.

The cache-hit judgement process performed in this step is the same as that performed in step ST5 in the main process flow of FIG. 7. That is, the cache comparator 42 is activated which then checks whether a copy of the data block indicated by the read request address issued by the processor 30 is stored as valid data in the cache memory 40; if it is stored as valid data, the hit flag is set to "1", and otherwise, the hit flag is set to "0".

Next, as shown in step ST15 in the main process flow of FIG. 7, the hit flag is tested to determine whether the flag value is "1" or "0".

If it is determined that the hit flag value is "1", the data to be read is present in the cache memory 40; therefore, as shown in step ST16 in the main process flow of FIG. 7, a cache access operation for data read is performed to read the read data stored in the cache memory 40, and the data is transferred to the processor 30, after which the process is terminated.

Figure 11A:
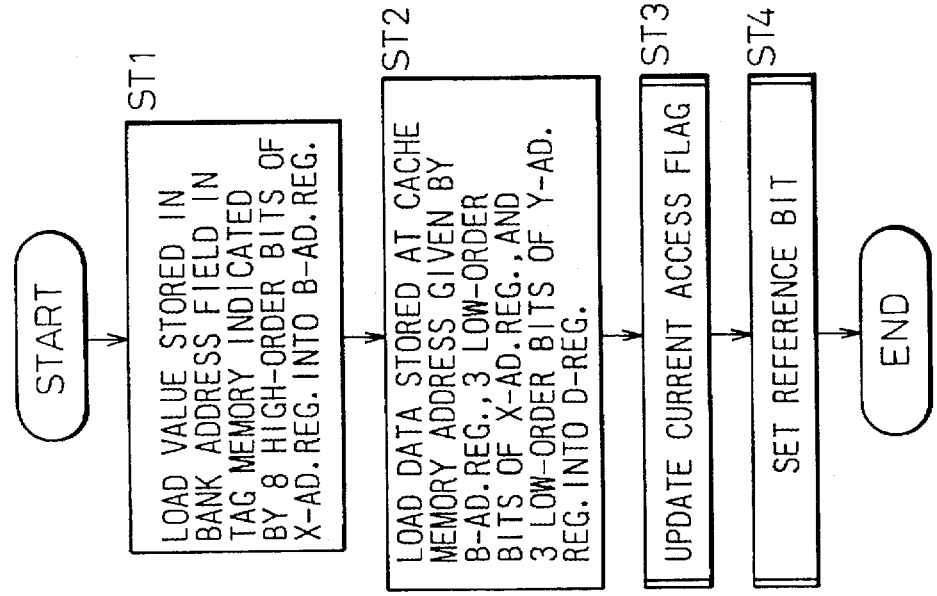

In the cache access operation for data read, as shown in detail in the process flow of FIG. 11A, the bank address stored in the bank address field in the TAG memory 60 indicated by the X' stored in the X address register 41a is read out and loaded into the bank address register 62. Next, the intra-block address, specified by the 3 low-order bits of the X address stored in the X address register 41a and the 3 low-order bits of the Y address stored in the Y address register 41b, is identified, and in accordance with this intra-block address, the requested data is read out of the data block stored in the memory area indicated by the value stored in the bank address register 62, and is loaded into a read register not shown (D register). Next, as shown in the process flow of FIG. 15C, the flag values of all the current access flags 51 are set to "0" first, and then, the flag value of the current access flag 51 corresponding to the bank address held in the bank address register 62 is set to "1" indicating the existence of the most recently accessed data. Then, as shown in the process flow of FIG. 15B, the flag value of the reference flag 50 corresponding to the bank address held in the bank address register 62 is set to "1" (if it is already set, the value is left as is), after which the process is terminated.

That is, in the cache access operation for data read, the read data stored in the cache memory 40 is read out and transferred to the processor 30, while the flag values of the current access flags 51 and reference flags 50 are updated.

On the other hand, if it is determined in step ST15 in the main process flow of FIG. 7 that the hit flag value is "0", the data to be read is not available in the cache memory 40; therefore, to store into the cache memory 40 the data block containing the data to be read, a block read operation is performed as shown in step ST17 in the main process flow of FIG. 7.

The block read operation will be described in detail below with reference to FIGS. 12 to 14. It will be noted here that the right-hand half and left-hand half of the process flow shown in FIG. 12 are carried out in parallel.

Figure 12:
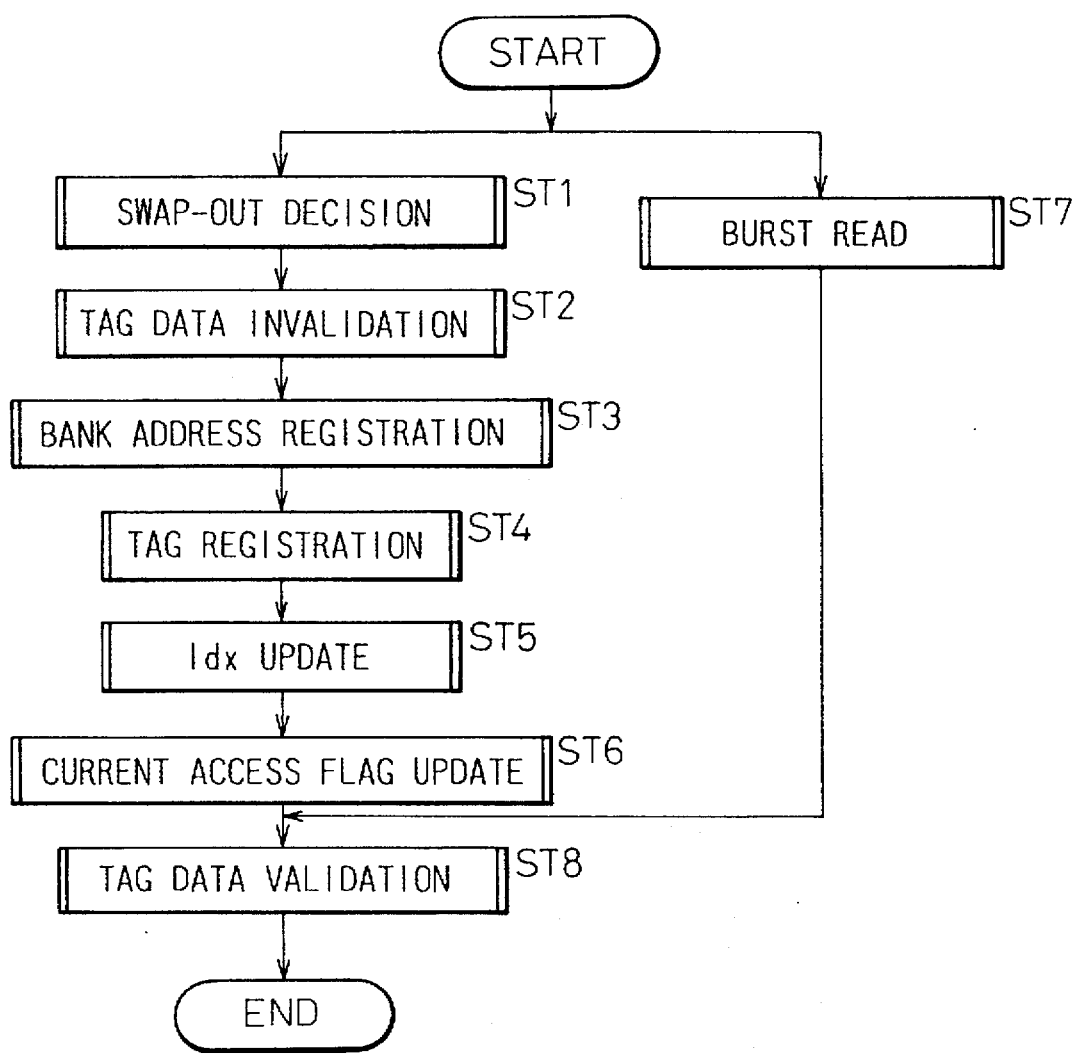
FIG. 12 is a diagram showing a process flow for a block read operation.

As shown in the process flow of FIG. 12, in the block read operation, first a decision is made in step ST1 as to what data block is to be swapped out.

Figure 13:
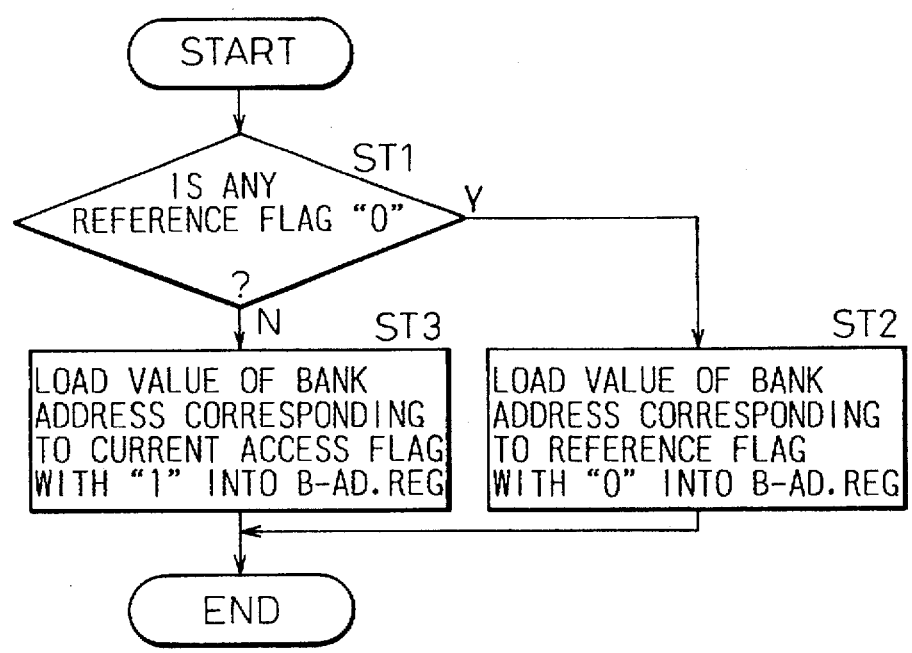
FIG. 13 is a diagram showing a process flow for a swap-out block deciding operation.

In this decision process, as shown in the process flow of FIG. 13, first a decision is made as to whether there is any reference flag 50 whose flag value is "0". If there is any such reference flag 50, the bank address in the cache memory 40 corresponding to that reference flag 50 is loaded into the bank address register 62; if there is no such reference flag 50, the bank address in the cache memory 40 corresponding to the current access flag 51 whose flag value is "1" is loaded into the bank address register 62.

As will be described later, the data block stored in the memory area indicated by the value stored in the bank address register 62 is the data block to be swapped out; in this decision process, therefore, if there is any memory area that has not been accessed from the time the reference flags 50 were last cleared, until the occurrence of the current access, the data block stored in that memory area is decided as the swap-out data block. If there is no such memory area, the most recently accessed data block is decided as the swap-out block.

Next, in step ST2, registration data in the TAG memory is invalidated for the data block that has been decided as the swap-out block.

Figure 16A:
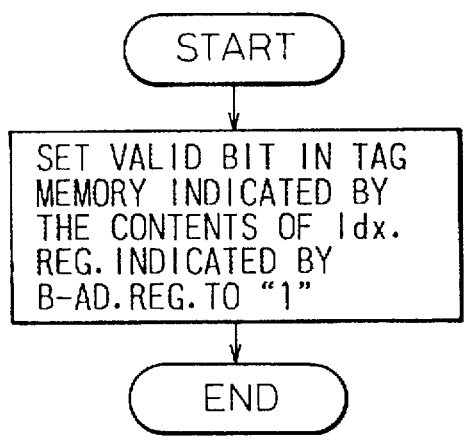
FIGS. 16A to 16D are diagrams each showing a process flow for TAG updating.

In the invalidation process, as shown in the process flow of FIG. 16A, the valid bit for the entry in the TAG memory 60, indicated by the X' value in the index register 52 corresponding to the bank address held in the bank address register 62, is set to "1" indicating that the data is invalid. That is, the valid bit in the TAG memory 60 for the data block decided as the swap-out block is invalidated.

Next, in step ST3, the bank address at which the data block containing the read data is to be stored is registered in the TAG memory 60.

Figure 16B:
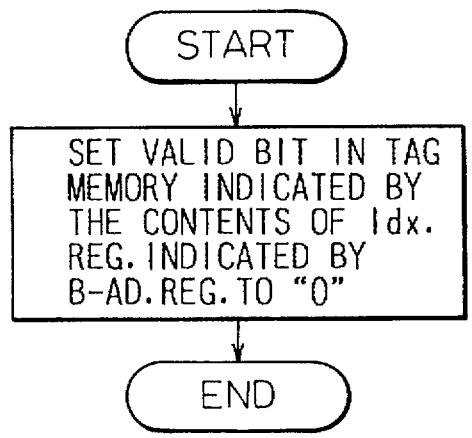
Figure 16C:
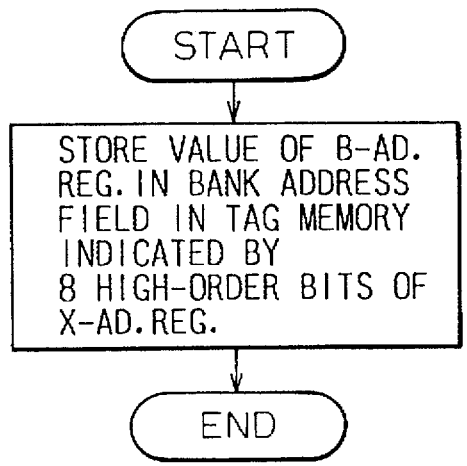

In this registration process, as shown in the process flow of FIG. 16C, the bank address held in the bank address register 62 is stored into the bank address field in the TAG memory 60 indicated by the X' held in the X address register 41a. That is, the bank address of the destination area is entered into the bank address field in the TAG memory 60 for the data block that is to be stored.

Next, in step ST4, the tag value Y' of the data block containing the read data is registered in the TAG memory 60.

Figure 16D:
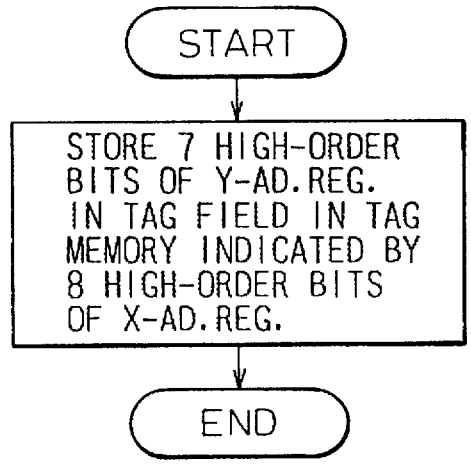

In this registration process, as shown in the process flow of FIG. 16D, the tag Y' held in the Y address register 41b is stored into the TAG field in the TAG memory 60 indicated by the tag address X' held in the X address register 41a. That is, the Y, value of the data block to be stored is entered into the TAG field in the TAG memory for that data block.

Next, in step ST5, the register value of the index register 52 is updated.

Figure 15A:
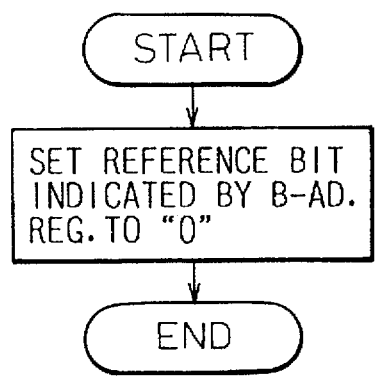
FIGS. 15A to 15D are diagrams each showing a process flow for control flag updating.
Figure 15B:
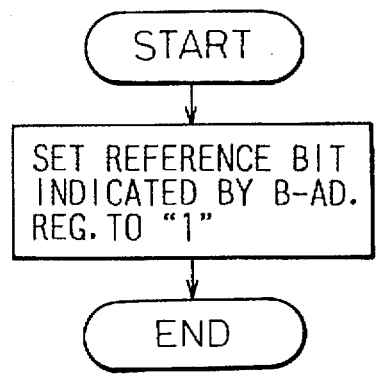
Figure 15C:
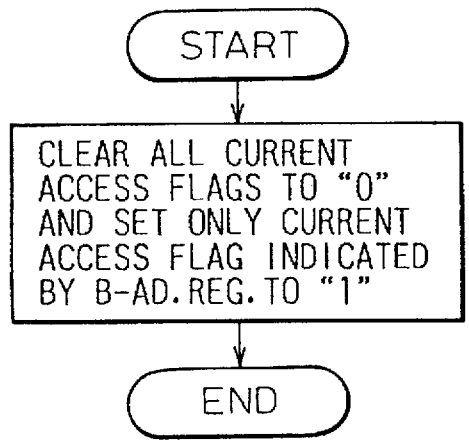
Figure 15D:
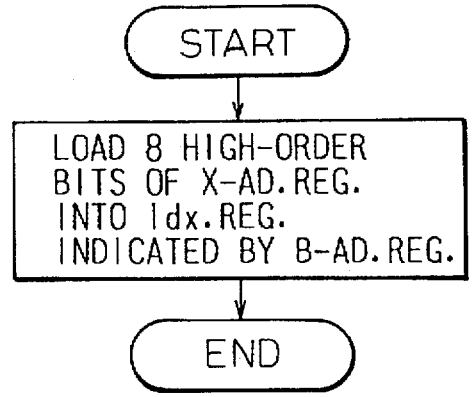

In this updating process, as shown in the process flow of FIG. 15D, the X' value held in the X address register 41a is stored into the index register 52 corresponding to the bank address held in the bank address register 52. That is, the index register 52 is updated so that it points to the newly validated entry in the TAG memory 60.

Next, in step ST6, the flag value of the current access flag 51 is updated.

In this updating process, as shown in the process flow of FIG. 15C, the flag values of all the current access flags 51 are set to "0" first; then, the current access flag 51 corresponding to the bank address held in the bank address register 62 is identified, and its flag value is set to "1" indicating the existence of the most recently accessed data.

Simultaneously with the processing from step ST1 to step ST6, a burst read operation in step ST7 is performed to store a copy of the data block containing the read data into the cache memory 40.

Figure 14:
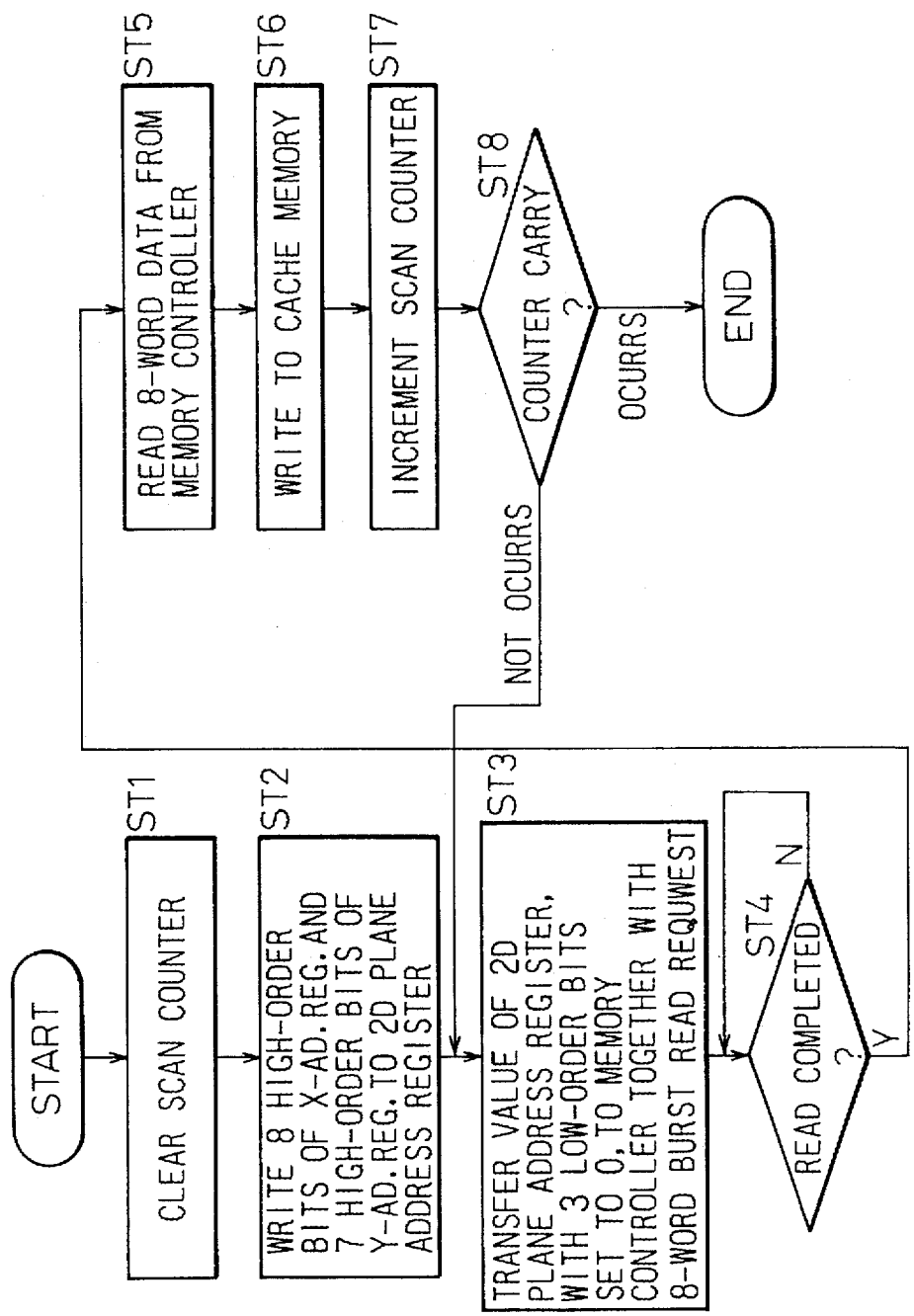
FIG. 14 is a diagram showing a process flow for a burst read operation.
Figure 17:
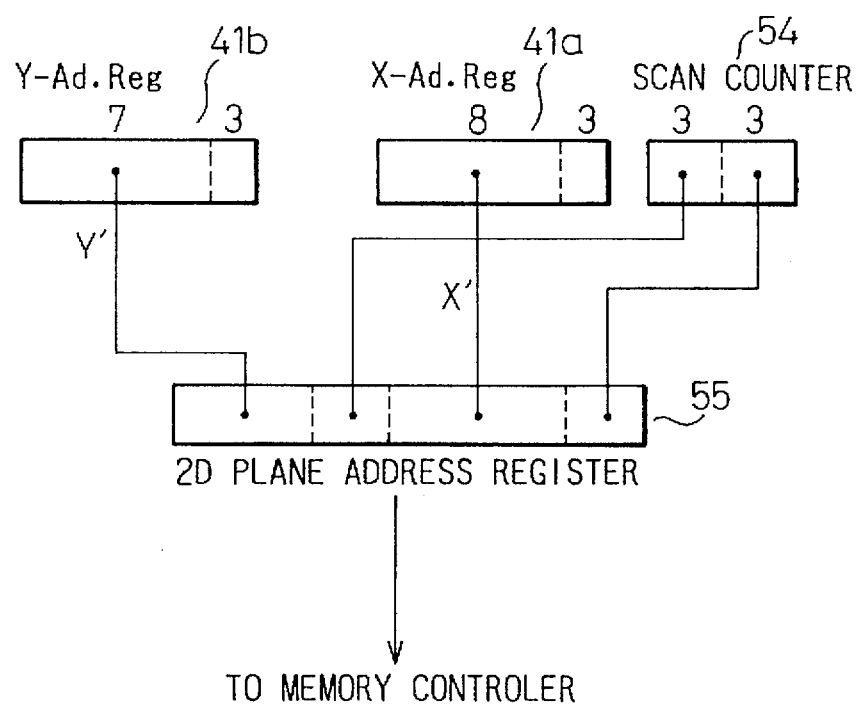
FIG. 17 is a diagram for explaining the generation of an address in a burst access mode.

In the burst read operation, as shown in detail in the process flow of FIG. 14, first the count value of the 6-bit scan counter 54 is cleared. Then, the count value of the scan counter 54, the X' value stored in the X address register 41a, and the Y' value stored in the Y address register 41b are loaded into the 2-D plane address register 55 in accordance with the format shown in FIG. 17. By designating the address stored in the 2-D plane address register 55, a burst read request for 8-word data is issued to the memory controller 33. Next, the 8-word data transferred in response to the burst read request is received, which is then written to the memory area in the cache memory 60 indicated by the value stored in the bank address register 62. Then, the count value of the scan counter 54 is incremented by 8 to update the stored value in the 2-D plane address register 55. If a carry-over occurs in the scan counter 54, the process is terminated; if no carry-over occurs, the address stored in the 2-D plane address register 55 is designated again, and a burst read request for 8-word data is issued to the memory controller 33, thus repeating the process.

That is, in the burst read operation, starting at the block address (X', Y') indicated by the data block containing the data requested by the processor, the X, Y addresses indicating data in that data block are sequentially issued to store a copy of that data block into the cache memory 40.

Thus, in the process flow of FIG. 12, when the processing in steps ST1 to ST6 and the processing for the burst read operation in step ST7 are completed, in the final step ST8 the registration data in the TAG memory for the newly stored data block is then made valid.

In this validation step, as shown in the process flow of FIG. 16B, the valid bit for the entry in the TAG memory 60, indicated by the X' value in the index register 52 corresponding to the bank address held in the bank address register 62, is set to "1" indicating that the data is valid.

As described above, in the cache-memory system of the present invention, the configuration of the tag memory and the cache hit/miss judgement processing implemented by it are similar to those employed in the conventional congruent type or a multi-way organization of that type, i.e., set associative type. However, according to the invention, since the association between each stored tag and its corresponding cache memory area is not fixed but is determined dynamically, the number of tags and the number of cache memory banks can be designed independently of each other; furthermore, even in situations where processing concentrates on a particular data block during operation, the memory areas can be used efficiently.

The example illustrated above employs an arrangement in which a tag made up of the high-order bits Y' of the Y address is stored in the tag memory addressed by the high-order bits X' of the X address, but it will be appreciated that the opposite is also possible. Furthermore, the bits constituting X' and Y' may be allocated arbitrarily between the tag bits and the tag address bits.

The above example has dealt with the processing of data that is addressed by a two-dimensional address X, Y, but it will be recognized that the processing of data addressed by a three-dimensional address X, Y, Z can be accomplished by appropriately allocating the respective high-order bits X', Y', and Z' between the tag bits and the tag address bits. In a like manner, the processing can be easily extended to handle data having any higher-dimensional address.

We claim:

1. A cache-memory system for processing multi-dimensional data stored in a main memory having a location specified by a combination of a plurality of data addresses, the cache-memory system comprising:

a cache memory having a plurality of memory areas for storing copies of data blocks in a multi-dimensional spread in the main memory, each data block being specified by a block address comprising a combination of high-order bits of the plurality of data addresses, each data block having data specified by an intra-block address comprising a combination of low-order bits of the plurality of data addresses;

a cache comparator for determining whether a copy of the data specified by a combination of a plurality of specified data addresses is stored in said cache memory; and a control block for controlling said main memory and said cache memory in accordance with the determination made by said cache comparator.

2. A cache-memory system for processing data stored in a main memory having a location specified by a combination of a plurality of data addresses, the cache memory system comprising:

a cache memory having a plurality of memory areas for storing copies of data blocks in a multi-dimensional spread in the main memory, each data block being specified by a block address comprising a combination of high-order bits of the plurality of data addresses, each data block having data specified by an intra-block address comprising a combination of low-order bits of the plurality of data addresses;

a cache comparator having:

a tag memory for storing, in a memory location specified by a tag address comprising a first part of bits of the block address, a tag comprising a second part of bits of the block address, and for storing in said memory location a valid flag indicating whether a copy of the data block specified by the block address identified by said tag and the tag address thereof is validly stored in said cache memory, and for storing a bank address that specifies the memory area holding a valid copy; and a match detection circuit for determining a cache hit has occurred when the tag stored in the memory location in said tag memory specified by the tag address matches the tag and if the valid flag stored in said memory location is true; and a control block for controlling said main memory and said cache memory, the control block having:

means for reading a bank address stored in the memory location in said tag memory specified by the tag address, when an instruction is given to access the memory location specified by the combination of said specific data addresses, via said cache memory, when said match detection circuit determines that a cache hit has occurred, and for accessing the memory location specified by the intra-block address in the copy of said data block stored in the memory area in said cache memory specified by said bank address.

3. A cache-memory system according to claim 2, wherein said control block further comprises:

block read means for reading into a memory area in said cache memory a data block containing the data specified by the combination of said specific data addresses, when an instruction is given to read said data, via said cache memory, and said match detection circuit determines that a cache miss has occurred; and said block read means comprising:

swap-out deciding means for identifying a memory area where a copy of the data block to be swapped out is stored;

means for setting the valid flag false in said tag memory currently corresponding to the memory area identified as holding the copy of said data block to be swapped out;

means for storing, in the memory location in said tag memory specified by the tag address the tag ;

means for burst-reading a copy of the data block containing said specified data into said memory area; and means for setting the valid flag in said memory location in said tag memory to true after the burst read is completed.

4. A cache-memory system according to claim 3, wherein if there is any memory area in said cache memory not previously accessed for a predetermined number of data accesses, said swap-out deciding means identifies that memory area as the memory for holding a copy of the data block to be swapped out, and if there is no such memory area, then identifies the last accessed memory area as the memory area for holding a copy of the data block to be swapped out.

5. A cache-memory system according to claim 2, wherein said control block further comprises:

means for judging whether a specified data access mode is a normal mode in which the access is to be made via said cache memory or a bypass mode in which said cache memory is to be bypassed; and means for setting the valid flag false in the memory location in said tag memory specified by the tag address when an instruction is given to write data in the bypass mode when said cache comparator determines that a cache hit has occurred.

6. A cache-memory system according to claim 5, wherein said control block further comprises:

means for writing data to the memory locations in said cache memory and said main memory specified by the combination of said specific data addresses when an instruction is given to write said data in the normal mode and said cache comparator determines that a cache hit has occurred.

7. A cache-memory system for processing data stored in a main memory whose location is specified by a combination of a plurality of data addresses, the cache-memory system comprising:

a cache memory having a plurality of memory areas for storing copies of data blocks, each data block being specified by a block address comprising a first part of a combination of the plurality of data addresses, data in each data block being specified by an intra-block address comprising a second part of the combination of the plurality of data addresses;

a cache comparator for determining whether a copy of the data specified by a combination of a plurality of specified data addresses is stored in said cache memory; and a control block for controlling said main memory and said cache memory in accordance with the determination made by said cache comparator, wherein said cache comparator comprises:
　a tag memory for storing, in a memory location specified by a tag address comprising a first part of bits of the block address, a tag comprising a remaining second part of the bits of the block address, and for storing in said memory location a valid flag indicating whether a copy of the data block specified by the block address determined by said tag and the tag address thereof is validly stored in said cache memory, and for storing a bank address that specifies the memory area holding a valid copy; and
　a match detection circuit for determining a cache hit has occurred when the tag stored in the memory location in said tag memory specified by the tag address matches the tag and if the valid flag stored in said memory location is true; and said control block comprises:
　means for reading a bank address stored in the memory location in said tag memory specified by the tag address when an instruction is given to access the memory location specified by the combination of said specific data addresses, via said cache memory, when said match detection circuit determines that a cache hit has occurred, and for accessing the memory location specified by the intra-block address in the copy of said data block stored in the memory area in said cache memory specified by said bank address.

8. A cache-memory system according to claim 7, wherein said control block further comprises:
　block read means for reading into a memory area in said cache memory a data block containing the data specified by the combination of said specific data addresses, when an instruction is given to read said data, via said cache memory, and said match detection circuit determines that a cache miss has occurred; and said block read means comprising:
　　swap-out deciding means for identifying a memory area where a copy of the data block to be swapped out is stored;
　　means for setting the valid flag false in said tag memory currently corresponding to the memory area decided as holding the copy of said data block to be swapped out;
　　means for storing, in the memory location in said tag memory specified by the tag address the tag;
　　means for burst-reading a copy of the data block containing said specified data into said memory area; and
　　means for setting the valid flag true in said memory location in said tag memory after the burst read is completed.

9. A cache-memory system according to claim 8, wherein if there is any memory area in said cache memory not previously accessed for a predetermined number of data accesses, said swap-out deciding means identifies that memory area as the memory area for holding a copy of the data block to be swapped out, and if there is no such memory area, then identifies the last accessed memory area as the memory area for holding a copy of the data block to be swapped out.

10. A cache-memory system according to claim 7, wherein said control block further comprises:
　means for judging whether a specified data access mode is a normal mode in which the access is to be made via said cache memory or a bypass mode in which said cache memory is to be bypassed, and
　means for setting the valid flag false in the memory location in said tag memory specified by the tag address when an instruction is given to write data in the bypass mode and said cache comparator judges that a cache hit has occurred.

11. A cache-memory system according to claim 10, wherein said control block further comprises:
　means for writing data to the memory locations in said cache memory and said main memory specified by the combination of said specific data addresses when an instruction is given to write said data in the normal mode and when said cache comparator determines that a cache hit has occurred.

\* \* \* \* \*

UNITED STATES PATENT AND TRADEMARK OFFICE
CERTIFICATE OF CORRECTION

PATENT NO. : 5,749,089
DATED : May 5, 1998
INVENTOR(S) : Hideki YOSHIZAWA et al.

It is certified that error appears in the above-identified patent and that said Letters Patent is hereby corrected as shown below:

Title Page, Foreign Patent Documents, delete the first occurrence of "2 238 490 9/1990 Japan".

Signed and Sealed this

Twenty-seventh Day of October, 1998

Attest:

BRUCE LEHMAN

*Attesting Officer*  *Commissioner of Patents and Trademarks*